US010261915B2

(12) United States Patent
John et al.

(10) Patent No.: US 10,261,915 B2
(45) Date of Patent: Apr. 16, 2019

(54) INTELLIGENTLY PARTITIONING DATA CACHE TO ALLOCATE SPACE FOR TRANSLATION ENTRIES

(71) Applicant: Board of Regents, The University of Texas System, Austin, TX (US)

(72) Inventors: Lizy K. John, Austin, TX (US); Yashwant Marathe, Austin, TX (US); Jee Ho Ryoo, Austin, TX (US); Nagendra Gulur, Dallas, TX (US)

(73) Assignee: Board of Regents, The University Of Texas System, Austin, TX (US)

( * ) Notice: Subject to any disclaimer, the term of this patent is extended or adjusted under 35 U.S.C. 154(b) by 0 days.

(21) Appl. No.: 15/706,573

(22) Filed: Sep. 15, 2017

(65) Prior Publication Data

US 2019/0087350 A1    Mar. 21, 2019

(51) Int. Cl.
*G06F 12/10* (2016.01)
*G06F 12/12* (2016.01)
(Continued)

(52) U.S. Cl.
CPC ...... *G06F 12/1027* (2013.01); *G06F 12/1018* (2013.01); *G06F 12/126* (2013.01);
(Continued)

(58) Field of Classification Search
CPC ............ G06F 12/1027; G06F 12/1018; G06F 12/126; G06F 2212/652; G06F 2212/681; G06F 2212/684
See application file for complete search history.

(56) References Cited

U.S. PATENT DOCUMENTS

| 4,463,424 A | * | 7/1984 | Mattson | ................ G06F 12/123 711/136 |
| 5,737,750 A | * | 4/1998 | Kumar | .................. G06F 9/3804 711/125 |

(Continued)

OTHER PUBLICATIONS

Marathe et al, "CSALT: Context Switch Aware Large TLB," MICRO-50, Proceedings of the 50th Annual IEEE/ACM International Symposium on Microarchitecture, Cambridge, Massachusetts, Oct. 14-18, 2017, pp. 449-462.*

(Continued)

*Primary Examiner* — Glenn Gossage (57) ABSTRACT

A processor architecture which partitions on-chip data caches to efficiently cache translation entries alongside data which reduces conflicts between virtual to physical address translation and data accesses. The architecture includes processor cores that include a first level translation lookaside buffer (TLB) and a second level TLB located either internally within each processor core or shared across the processor cores. Furthermore, the architecture includes a second level data cache (e.g., located either internally within each processor core or shared across the processor cores) partitioned to store both data and translation entries. Furthermore, the architecture includes a third level data cache connected to the processor cores, where the third level data cache is partitioned to store both data and translation entries. The third level data cache is shared across the processor cores. The processor architecture can also include a data stack distance profiler and a translation stack distance profiler.

21 Claims, 3 Drawing Sheets

(51) Int. Cl.
*G06F 12/1027* (2016.01)
*G06F 12/1018* (2016.01)
*G06F 12/126* (2016.01)

(52) U.S. Cl.
CPC .. *G06F 2212/652* (2013.01); *G06F 2212/681* (2013.01); *G06F 2212/684* (2013.01)

(56) References Cited

U.S. PATENT DOCUMENTS

| | | | | |
|---|---|---|---|---|
| 6,282,613 | B1* | 8/2001 | Hsu | G06F 12/0802 |
| | | | | 711/118 |
| 7,293,157 | B1* | 11/2007 | Parikh | G06F 12/0864 |
| | | | | 711/147 |
| 8,713,258 | B1* | 4/2014 | Cypher | G06F 12/0877 |
| | | | | 711/132 |
| 2002/0062418 | A1* | 5/2002 | Luick | G06F 12/1063 |
| | | | | 711/3 |
| 2004/0260517 | A1* | 12/2004 | Ding | G06F 8/4442 |
| | | | | 702/186 |
| 2010/0205344 | A1* | 8/2010 | Caprioli | G06F 12/1063 |
| | | | | 711/3 |
| 2011/0153955 | A1 | 6/2011 | Herrenschmidt et al. | |
| 2014/0052917 | A1* | 2/2014 | Koka | G06F 12/1027 |
| | | | | 711/120 |
| 2016/0239212 | A1* | 8/2016 | Solihin | G06F 11/3037 |
| 2018/0150406 | A1* | 5/2018 | John | G06F 12/1063 |

OTHER PUBLICATIONS

Barr et al, "Translation Caching: Skip, Don't Walk (the Page Table)," Proceedings of the 37th International Symposium on Computer Architecture (ISCA 2010), Jun. 19-23, 2010, pp. 48-59.*

Ryoo et al., "Rethinking TLB Designs in Virtualized Environments: A Very Large Part-of-Memory TLB," ISCA '17 Jroceedings of the 44th Annual International Symposium on Computer Architecture, Toronto, Ontario, Canada, Jun. 24-28, 2017, pp. 469-480.

Yaniv et al., "Hash, Don't Cache (the Page Table)," SIGMETRICS'16, Antibes Juan-Les-Pins, France, Jun. 14-18, 2016, pp. 337-350.

Gandhi et al., "Efficient Memory Virtualization: Reducing Dimensionality of Nested Page Walks," Proceedings of the 47th Annual IEEE/ACM International Symposium on Microarchitecture, Cambridge, United Kingdom, Dec. 13-17, 2014, pp. 178-189.

* cited by examiner

INTELLIGENTLY PARTITIONING DATA CACHE TO ALLOCATE SPACE FOR TRANSLATION ENTRIES

TECHNICAL FIELD

The present invention relates generally to computing in virtualized environments, and more particularly to intelligently partitioning the data cache to allocate space for translation entries.

BACKGROUND

Computing in virtualized cloud environments has become a common practice for many businesses so as to reduce capital expenditures. Many hosting companies (which host the machines, such as servers, used by businesses) have found that the utilization of their machines is low.

In order to keep the machine utilization high, the hosting companies that maintain the host hardware typically attempt to keep just enough machines to serve the computing load and to allow multiple virtual machines to coexist on the same physical hardware. High central processing unit (CPU) utilization has been observed in many virtualized workloads.

The aforementioned trend means that the host machines are constantly occupied by applications from different businesses, and frequently, different contexts (processes or threads) are executed on the same machine. Although it is ideal for achieving high utilization, the performance of guest applications suffers from frequent context switching (process of storing and restoring the state of a process or thread so that execution can be resumed from the same point at a later time). The memory subsystem has to maintain consistency across the different contexts, and hence traditionally, processors used to flush caches and translation lookaside buffers (TLBs). A TLB stores the recent translations of virtual memory addresses to physical memory addresses. However, modern processors adopt a more efficient approach where each entry contains an address space identifier (ASID). Tagging the entry with ASID eliminates the needs to flush the TLB upon a context switch, and when the swapped-out context returns, some of its previously cached entries will be present. Although these optimizations worked well with traditional benchmarks where the working set, or memory footprint, was manageable between context switches, this trend no longer holds for emerging workloads. The memory footprint of emerging workloads is orders of magnitude larger than traditional workloads, and hence the capacity requirement of TLBs as well as data caches is much larger. This means that the cache and TLB contents of the previous context will frequently be evicted from the capacity constrained caches and TLBs since the applications need a larger amount of memory. Although there is some prior work that optimizes context switches, there is very little literature that is designed to handle the context switch scenarios caused by huge footprints of emerging workloads that flood data caches and TLBs.

The performance overhead of address translation in virtualized systems is considerable as many TLB misses incur a full two-dimensional page walk. The page walk in a virtualized system begins with a guest virtual address (gVA) when an application makes a memory request. However, since the guest and host system keep their own page tables, the gVA has to be translated to a host physical address (hPA). First, the gVA has to be translated to the guest physical address (gPA), which is the host virtual address (hVA). The hVA is finally translated to the hPA. This involves walking down a two-dimensional page table. Current x86-64 (64-bit version of the x86 instruction set) employs a 4-level page table, so the two-dimensional page walk may require up to 24 accesses. Making the situation worse, emerging architectures introduce a 5-level page table resulting in the page walk operation getting longer. Also, even though the L1-L2 TLBs are constantly getting bigger, they are not large enough to handle the huge footprint of emerging applications, and expensive page walks are becoming frequent.

Context switches in virtualized workloads are expensive. Since both the guest and host processes share the hardware TLBs, context switches across virtual machines can impact performance severely by evicting a large fraction of the TLB entries held by processes executing on any one virtual machine.

Conventional page walkers as well as addressable large capacity translation caches (such as the Oracle® SPARC® translation storage buffer) generate accesses that get cached in the data caches. In fact, these translation schemes rely on successful caching of translation (or intermediate page walk) entries in order to reduce the cost of page walks. There has also been some recent work that attempts to improve the address translation problem by implementing a very large L3 TLB that is a part of the addressable memory. The advantage of this scheme titled "part of memory TLB (POM-TLB)" is that since the TLB is very large (several orders of magnitude larger than conventional on-chip TLBs), it has room to hold most required translations, and hence most page walks are eliminated. However, since the TLB request is serviced from the dynamic random access memory (DRAM), the latency suffers. The POM-TLB entries are cached in fast data caches to reduce the latency problem, however, all of the aforementioned caching schemes suffer from the problem of cache contention due to the additional load on data caches caused by the cached translation entries.

As L2 TLB miss rates go up, proportionately, the number of translation-related accesses also goes up, resulting in congestion in the data caches. Since a large number of TLB entries are stored in data caches, now the data traffic hit rate is affected. When the cache congestion effects are added on top of cache thrashing due to context switching, which is common in modern virtualized systems, the amount of performance degradation is not negligible.

SUMMARY

In one embodiment of the present invention, a processor architecture comprises a first processor core comprising a first level translation lookaside buffer. The processor architecture further comprises a second level translation lookaside buffer located either internally or externally to the first processor core. The processor architecture additionally comprises a data cache partitioned to store both data and translation entries, where the data cache is located either internally or externally to the first processor core.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

As stated in the Background section, data caches get filled with a large fraction of page table entries, causing eviction of potentially useful entries. Such a problem is exacerbated in virtualized environments where each translation lookaside buffer (TLB) miss initiates a two-dimensional page walk. In virtualized environments with context switching, the problem worsens as TLB miss rates increase with the increase in the number of contexts. In such scenarios, clever management of cache capacity becomes important.

The principles of the present invention provide a means for more effectively managing cache capacity in such scenarios. In one embodiment, the present invention includes an architecture that partitions the on-chip data caches to efficiently cache page table entries and TLB entries alongside data which reduces the conflict between the virtual to physical address translation and data accesses.

The present invention utilizes an architecture referred to herein as "Context Switch Aware large TLB (C SALT)," which employs a novel dynamic cache partitioning scheme to reduce the contention in caches between data and translation entries (e.g., TLB entries, page table entries). CSALT employs a partitioning scheme based on monitoring of data and translation stack distances and marginal utility principles. The data stack distance represents the position of a data entry in the stack at a reference time. The translation stack distance represents the position of a translation entry (e.g., TLB entry) in the stack at a reference time. As discussed herein, CSALT may include a large L3 TLB which can practically hold all the required TLB entries. However, CSALT can be easily architected atop any other translation scheme. CSALT addresses increased cache congestion when L3 TLB entries (or entries pertaining to translation in other translation schemes) are allowed to be cached into L2 and L3 data caches by means of a novel cache partitioning scheme that separates the TLB and data traffic. This mechanism helps to withstand the increased memory pressure from emerging large footprint workloads especially in the virtualized context switching scenarios.

The address translation overhead in virtualized systems stems from one apparent reason, the lack of TLB capacity. If the TLB capacity were large enough, most of the page table walks would have been eliminated. The need for a larger TLB capacity is also seen as a recent generation of Intel® processors doubled the L2 TLB capacity from the previous generation. Traditionally, TLBs are designed to be small and fast, so that the address translation can be serviced quickly. Yet, emerging applications require much more memory than traditional server workloads. Some of these applications have terabytes of memory footprint, so that TLBs, which were not initially designed for such huge memory footprint, suffer significantly.

Recent work by Ryoo et al., "Rethinking TLB Designs in Virtualized Environments: A Very Large Part-of-Memory TLB," ISCA '17 Proceedings of the 44th Annual International Symposium on Computer Architecture, Toronto, Ontario, Canada, Jun. 24-28, 2017, pp. 469-480, uses a part of main memory to be used as a large capacity TLB. They use 16 MB of the main memory, which is negligible considering high-end servers have terabytes of main memory these days. However, 16 MB is orders of magnitude higher than today's on-chip TLBs, and thus, it can eliminate virtually all page table walks. This design achieves the goal of eliminating page table walks, but now this TLB suffers from slow access latency since off-chip DRAM is much slower than on-chip SRAMs. Consequently, they make this high-capacity TLB as addressable, so TLB entries can be stored in data caches. They call this TLB "part of memory TLB (POM-TLB)" as the TLB is given an explicit address space. In one embodiment, CSALT uses the POM-TLB organization as its substrate. It is noted that CSALT is a cache management scheme, and can be architected over other translation schemes, such as conventional page tables.

Figure 1:
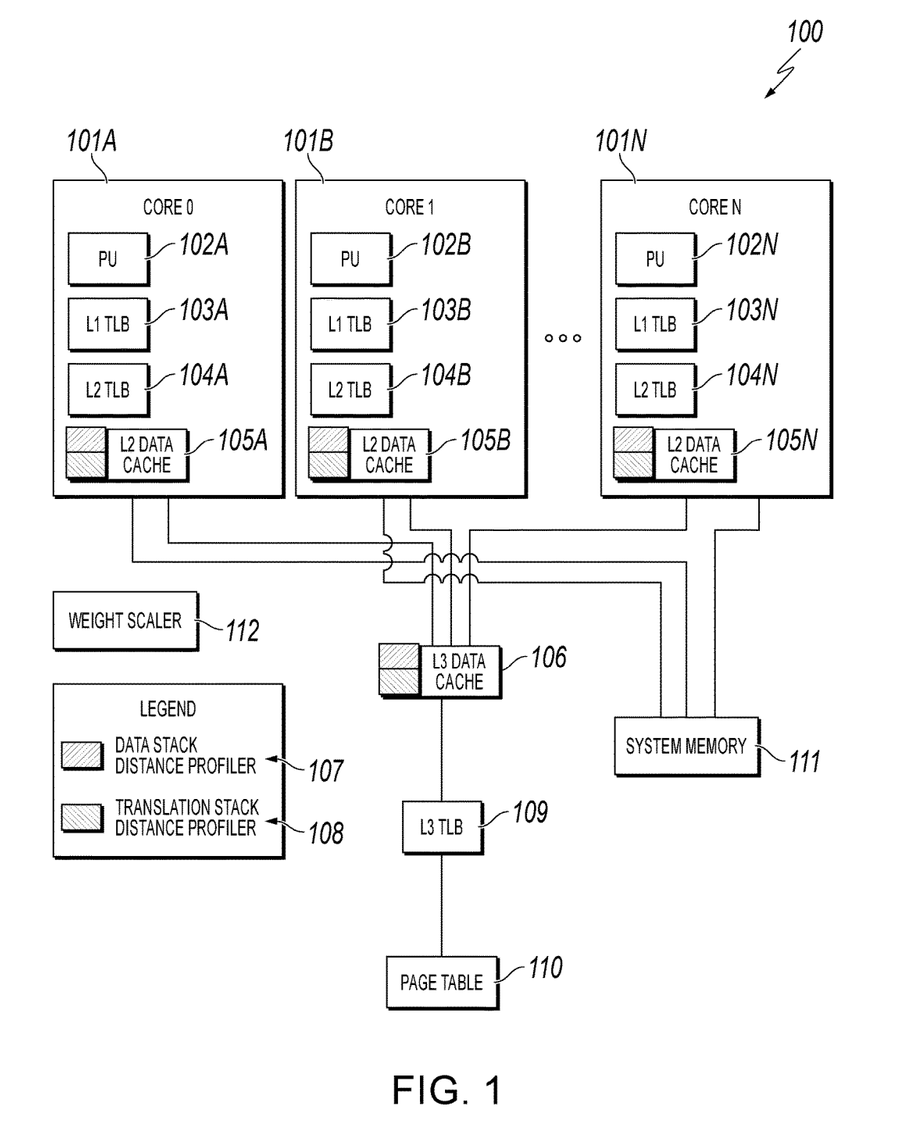
FIG. 1 illustrates a processor architecture that intelligently partitions the data cache to allocate space for translation entries in accordance with an embodiment of the present invention.

FIG. 1 illustrates a processor architecture 100 that intelligently partitions the data cache to allocate space for translation entries (e.g., TLB entries, page table entries) in accordance with an embodiment of the present invention. In particular, FIG. 1 depicts the processor architecture 100 incorporating CSALT architected over the POM-TLB.

As shown in FIG. 1, processor architecture 100 includes multiple processor cores 101A-101N (labeled as "Core 0," "Core 1," . . . "Core N"), where N is a positive integer number. Processor cores 101A-101N may collectively or individually be referred to as processor cores 101 or processor core 101, respectively. Processor architecture 100 utilizes processor cores 101 to read and execute program instructions at the same time thereby increasing overall speed for programs amenable to parallel computing.

Each processor core (or simply "core") 101 may include a processing unit (PU) and a first level (L1) translation lookaside buffer (TLB). For example, core 101A includes PU 102A and L1 TLB 103A. Core 101B includes PU 102B and L1 TLB 103B and core 101N includes PU 102N and L1 TLB 103N. PUs 102A-102N may collectively or individually be referred to as PUs 102 or PU 102, respectively. Furthermore, L1 TLBs 103A-103N may collectively or individually be referred to as L1 TLBs 103 or L1 TLB 103, respectively.

In one embodiment, each processor core 101 may include a second level (L2) translation lookaside buffer (TLB) as shown in FIG. 1. For example, core 101A includes L2 TLB 104A, core 101B includes L2 TLB 104B and core 101N includes L2 TLB 104N. L2 TLBs 104A-104N may collectively or individually be referred to as L2 TLBs 104 or L2 TLB 104, respectively.

While FIG. 1 illustrates a second level (L2) TLB 104 residing within each processor core 101, a single L2 TLB 104 may reside external to processor cores 101. In the embodiment where a single L2 TLB 104 is located external to processor cores 101, L2 TLB 104 is shared across the processor cores 101.

Additionally, each processor core 101 may include a L2 data cache. For example, core 101A includes L2 data cache 105A. Core 101B includes L2 data cache 105B and core 101N includes L2 data cache 105N. L2 data caches 105A-105N may collectively or individually be referred to as L2 data caches 105 or L2 data cache 105, respectively.

While FIG. 1 illustrates a second level (L2) data cache 105 residing within each processor core 101, a single L2 data cache 105 may reside external to processor cores 101. In the embodiment where a single L2 data cache 105 is located external to processor cores 101, L2 data cache 105 is shared across the processor cores 101.

In one embodiment, each processor core 101 is connected to a third level (L3) data cache 106 that is shared across the processor cores 101.

Figure 2:
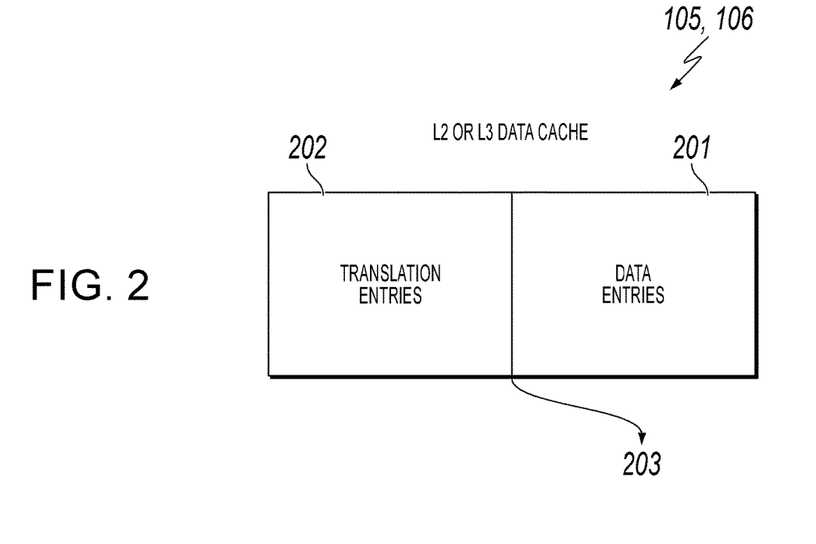
FIG. 2 illustrates the partitioning of L2 and L3 data caches between data entries and translation entries in accordance with an embodiment of the present invention.

In one embodiment, each L2 data cache 105 and L3 data cache 106 is partitioned among the data entries and translation entries (e.g., TLB entries, page table entries) as shown in FIG. 2.

FIG. 2 illustrates the partitioning of L2 and L3 data caches 105, 106 between data entries 201 and translation entries 202 (e.g., TLB entries, page table entries) via a partition 203 in accordance with an embodiment of the present invention. In one embodiment, the partition of L2 and L3 data caches 105, 106 is determined at least in part using data stack distance profiler 107 and translation stack distance profiler 108 as shown in FIG. 1. Data stack distance profiler 107 determines the data stack distance, which represents the position of a data entry in the stack at a reference time. Translation stack distance profiler 108 determines the translation stack distance, which represents the position of a translation entry (e.g., TLB entry) in the stack at a reference time. A further discussion regarding data stack distance profiler 107 and translation stack distance profiler 108 is provided further below.

Returning to FIG. 1, in one embodiment, L3 data cache 106 is connected to an L3 TLB 109. In one embodiment, L3 TLB 109 is made part of memory (referred to herein as the "POM-TLB"). In one embodiment, L3 TLB 109 is implemented in off-chip or die-stack dynamic random-access memory. While the following discusses L3 TLB 109 being implemented in off-chip or die-stack dynamic random-access memory, L3 TLB 109 may be implemented in any type of memory or storage device (e.g., phase-change memory (PCM), non-volatile random-access memory (NVRAM), static random-access memory (SRAM)).

Each of these TLBs 103, 104, 109 store recent translations of virtual memory to physical memory.

Furthermore, processor architecture 100 includes a page table 110 connected to L3 TLB 109, where page table 110 stores a mapping between virtual addresses and physical addresses.

In one embodiment, since the capacity of L3 TLB 109 is very large, L3 TLB 109 is mostly inclusive of L1 and L2 TLBs 103, 104, so entries are shared across all processor cores 101.

Additionally, in one embodiment, processor cores 101 are connected to system memory 111. In one embodiment, the algorithms (programs) discussed herein, such as the algorithms utilized in intelligently partitioning the L2, L3 data caches 105, 106 to allocate space for translation entries, is stored in system memory 111. In one embodiment, PU 102 is configured to execute the program instructions of these programs.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, electronic circuitry including, for example, programmable logic circuitry, field-programmable gate arrays (FPGAs), or programmable logic arrays (PLAs) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor to perform the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the functions/acts specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring to FIG. 1, CSALT encompasses L2 and L3 data cache management schemes. The role of the stack distance profilers 107, 108 shown in FIG. 1 is described below. Furthermore, as discussed below, the present invention implements a dynamic partitioning algorithm that helps to find a balanced partitioning of the L2, L3 data caches 105, 106 between translation and data entries to reduce the cache contention. Additionally, as discussed below, a notion of "criticality" is introduced to improve the dynamic partitioning algorithm by taking into account the relative costs of data cache misses.

Since prior state-of-the-art work does not distinguish between data and translation entries (e.g., TLB entries) when making cache replacement decisions, it achieves a suboptimal performance improvement. The goal of CSALT is to profile the demand for data and translation entries at runtime and adjust the cache capacity needed for each type of cache entry. CSALT dynamic partitioning algorithm (CSALT-D) (see Algorithm 1 further below) attempts to maximize the overall hit rate of data caches by allocating an optimal amount of cache capacity to data and translation entries. In order to do so, CSALT-D attempts to minimize interference between the two entry types. Assuming that a cache is statically partitioned by half for data and translation entries, if data entries have higher miss rates with the current allocation of cache capacity, CSALT-D would allocate more capacity for data entries. On the other hand, if translation entries have higher miss rates with the current partitioning scheme, CSALT-D would allocate more cache for translation entries. The capacity partitioning is adjusted at a fixed interval, which is referred to herein as an "epoch." In order to obtain an estimate of cache hit/miss rate for each type of entry when provisioned with a certain capacity, a cache hit/miss prediction model is implemented for each type of entry based on Mattson's Stack-Distance Algorithm (MSA). The MSA uses the least recently used (LRU) information of set-associative caches. For a K-way associative cache, LRU stack is an array of (K+1) counters, namely Counter 1 to Counter K+1. Counter 1 counts the number of hits to the Most Recently Used (MRU) position, and Counter K counts the number of hits to the LRU position. Counter K+1 counts the number of misses incurred by the set. Each time there is a cache access, the counter corresponding to the LRU stack distance where the access took place is incremented.

The LRU stack can be used to predict the hit rate of the cache when the associativity is increased/reduced. For instance, consider a 16-way associative cache where the LRU stack distance for each of the accesses in a LRU stack is recorded. If the associativity is decreased to 4, all the accesses which hit in positions LRU4-LRU15 in the LRU stack previously would result in a miss in the new cache with decreased associativity (LRU0 is the MRU position). Therefore, an estimate of the hit rate in the new cache with decreased associativity can be obtained by summing up the hit rates in the LRU stack in positions LRU0-LRU3.

For a K-way associative cache, the dynamic partitioning scheme of the present invention works by allocating certain ways (0:N−1) for data entries and the remaining ways for translation entries (N:K−1) in each set in order to maximize the overall cache hit rate. For each cache which needs to be dynamically partitioned, two additional structures are introduced: a data LRU stack, and a translation LRU stack corresponding to data and translation entries, respectively. The data LRU stack serves as a cache hit rate prediction model for data entries, whereas, the translation LRU stack serves as a cache hit rate prediction model for translation entries (e.g., TLB entries). Estimates of the overall cache hit rates can be obtained by summing over appropriate entries in the data and translation LRU stacks. For instance, in a 16-way associative cache with 10 ways allocated for data entries and remaining ways allocated for translation entries, an estimate of the overall cache hit rate can be obtained by summing over LRU0-LRU9 in the data LRU stack and LRU0-LRU5 in the translation LRU stack.

This estimate of the overall cache hit rate obtained from the LRU stack is referred to as the "marginal utility" of the partitioning scheme. Consider a K-way associative cache. Let the data LRU stack be represented as D_LRU and the translation LRU stack for TLB entries be represented as TLB_LRU. Consider a partitioning scheme P that allocates N ways for data entries and M=K−N ways for TLB entries. Then, the marginal utility of P, denoted by $MU_N^P$ is given by the following equation, $$MU_N^P = \sum_{i=0}^{N-1} D_{LRU}(i) + \sum_{j=0}^{K-N-1} TLB\_LRU(j) \quad (1)$$

Figure 3:
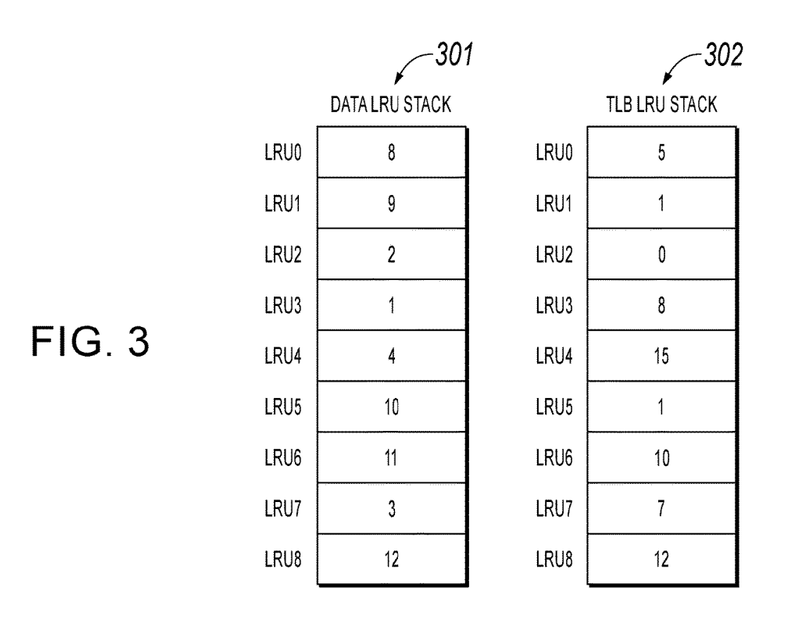
FIG. 3 illustrates an exemplary data least recently used (LRU) stack and a translation lookaside buffer (TLB) LRU stack containing the data and the TLB entries, respectively, at the end of the epoch in accordance with an embodiment of the present invention.

CSALT-D attempts to maximize the marginal utility of the cache at each epoch by comparing the marginal utility of different partitioning schemes. Consider the example shown in FIG. 3 for an 8-way associative cache. FIG. 3 illustrates an exemplary data least recently used (LRU) stack 301 and a TLB LRU stack 302 containing the data and the TLB entries, respectively, at the end of the epoch in accordance with an embodiment of the present invention. While FIG. 3 illustrates TLB LRU stack 302 containing TLB entries, it is noted that TLB LRU stack 302 may correspond to a stack 302 that stores other types of translation entries, such as page table entries. Stack 302 may be referred to herein as a "translation stack" to refer to a stack that may store any type of translation entry, including TLB entries and page table entries. Furthermore, while the following discusses TLB entries, the description is applicable to other types of translation entries, such as page table entries.

Suppose the current partitioning scheme assigns N=4, representing the number of ways allocated for data entries, and M=4, representing the number of ways allocated for TLB entries. At the end of an epoch, the D_LRU and TLB_LRU contents are shown in FIG. 3. In this case, the dynamic partitioning algorithm (see Algorithm 1 listed below) finds the marginal utility for the following partitioning schemes (not every partitioning is listed):

---
Algorithm 1 Dynamic Partitioning Algorithm
---
1: N = Number of ways to be allocated for data
2: M = Number of ways to be allocated for TLB
3:
4: for n in $N_{min}$: K −1 do
5:    $MU_n$ = compute_MU(n)
6:

7: $N = \underset{N}{\mathrm{argmax}}(MU_{N_{min}}, MU_{N_{min}+1}, \ldots , MU_{K-1})$

8: M = K − N
---

$$MU_4^{P1} = \sum_{i=0}^{3} D\_LRU + \sum_{j=0}^{3} TLB_{LRU(j)} = 34$$

$$MU_5^{P2} = \sum_{i=0}^{4} D\_LRU + \sum_{j=0}^{2} TLB_{LRU(j)} = 30$$

$$MU_6^{P3} = \sum_{i=0}^{5} D\_LRU + \sum_{j=0}^{1} TLB_{LRU(j)} = 40$$

$$MU_7^{P4} = \sum_{i=0}^{6} D\_LRU + \sum_{j=0}^{0} TLB_{LRU(j)} = 50$$

Among the computed marginal utilities, the dynamic scheme of the present invention chooses the partitioning that yields the best marginal utility. In the above example, CSALT-D chooses partitioning scheme P4. This is as elaborated in Algorithm 1 (see above) and Algorithm 2 (see below).

---
Algorithm 2 Computing Marginal Utility
---
1: N = Input
2: D_LRU = Data LRU Stack
3: TLB_LRU = TLB LRU Stack
4: MU = 0
5:
6: for i in 0 : N − 1 do
7:    MU += TLB_LRU (i)
8: for j in 0 : K − N − 1 do
9:    MU += TLB_LRU (j)
10: return MU
---

Once the partitioning scheme $P_{new}$ is determined by the CSALT-D algorithm, it is enforced globally on all cache sets. Suppose the old partitioning scheme $P_{old}$ allocated $N_{old}$ ways for data entries, and the updated partitioning scheme $P_{new}$ allocates $N_{new}$ ways for data entries. The following two cases: (a) $N_{old} < N_{new}$ and (b) $N_{old} > N_{new}$ are considered and discussed in connection with how the partitioning scheme $P_{new}$ affects the cache lookup and cache replacement. While CSALT-D has no affect on the cache lookup, CSALT-D does affect replacement decisions. The lookup and replacement policies are now described in detail below.

Cache Lookup:

All K-ways of a set are scanned irrespective of whether a line corresponds to a data entry or a TLB entry during cache lookup. In case (a), even after enforcing $P_{new}$, there might be TLB entries resident in the ways allocated for data (those numbered $N_{old}$ to $N_{new}-1$). On the other hand, in case (b), there might be data entries resident in the ways allocated for TLB entries (ways numbered $N_{new}$ to $N_{old}-1$). This is why all ways in the cache are looked up.

Cache Replacement:

In the event of a cache miss, consider the case where an incoming request corresponds to a data entry. In both case (a) and (b), CSALT-D evicts the LRU cacheline in the range (0; $N_{new}-1$) and places the incoming data line in its position. On the other hand, if the incoming line corresponds to a TLB entry, in both case (a) and (b), CSALT-D evicts the LRU-line in the range ($N_{new}$; K−1) and places the incoming TLB line in its position.

Classifying Addresses as Data or TLB:

Incoming addresses can be classified as data or TLB by examining the relevant address bits. Since POM-TLB 109 is a memory mapped structure, the cache controller can identify if the incoming address is to the POM-TLB or not. For stored data in the cache, there are two ways by which this classification can be done: i) by adding 1 bit of metadata per cache block to denote data (0) or TLB (1), or ii) by reading the tag bits and determining if the stored address falls in the L3 TLB address range or not.

Figure 4:
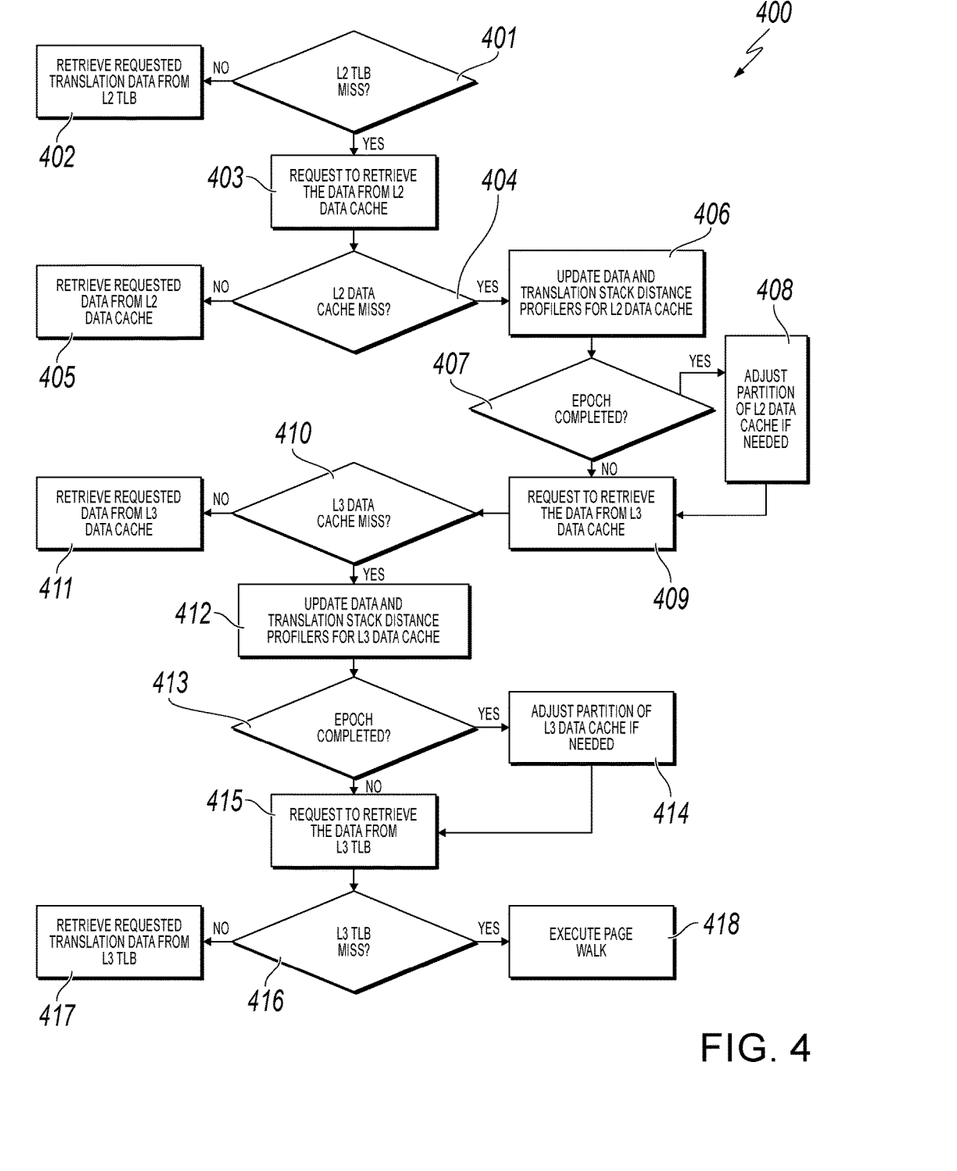
FIG. 4 is a flowchart of a method for partitioning the data cache to allocate space for translation entries in accordance with an embodiment of the present invention.

Referring now to FIG. 4, FIG. 4 is a flowchart of a method 400 for partitioning the data cache (e.g., L2 data cache 105, L3 data cache 106) to allocate space for translation entries (e.g., TLB entries, page table entries) in accordance with an embodiment of the present invention.

Referring to FIG. 4, in conjunction with FIGS. 1-3, in step 401, a determination is made by processing unit (PU) 102 as to whether the request to retrieve data from L2 TLB 104 resulted in a miss. If there was a hit to L2 TLB 104, then, in step 402, PU 102 retrieves the requested translation data (translation of a virtual address to its physical address) from L2 TLB 104.

If, however, there was a miss to L2 TLB 104, then, in step 403, PU 102 requests to retrieve the data from L2 data cache 105.

In step 404, a determination is made by PU 102 as to whether the request to retrieve data from L2 data cache 105 resulted in a miss.

If there was a hit to L2 data cache 105, then, in step 405, PU 102 retrieves the requested data (e.g., translation of a virtual address to its physical address) from L2 data cache 105.

If, however, there was a miss to L2 data cache 105, then, in step 406, PU 102 updates the data and translation stack distance profilers 107, 108 for L2 data cache 105.

In step 407, a determination is made by PU 102 as to whether the epoch is completed.

If the epoch is completed, then, in step 408, PU 102 adjusts partition 203 of L2 data cache 105 if needed.

If, however, the epoch is not completed or after adjusting partition 203 of L2 data cache 105 if needed, then, in step 409, PU 102 requests to retrieve the data from L3 data cache 106.

In step 410, a determination is made by PU 102 as to whether the request to retrieve data from L3 data cache 106 resulted in a miss.

If there was a hit to L3 data cache 106, then, in step 411, PU 102 retrieves the requested data (e.g., translation of a virtual address to its physical address) from L3 data cache 106.

If, however, there was a miss to L3 data cache 106, then, in step 412, PU 102 updates the data and translation stack distance profilers 107, 108 for L3 data cache 106.

In step 413, a determination is made by PU 102 as to whether the epoch is completed.

If the epoch is completed, then, in step 414, PU 102 adjusts partition 203 of L3 data cache 106 if needed.

If, however, the epoch is not completed or after adjusting partition 203 of L3 data cache 106 if needed, then, in step 415, PU 102 requests to retrieve the data from L3 TLB 109.

In step 416, a determination is made by PU 102 as to whether the request to retrieve data from L3 TLB 109 resulted in a miss.

If there was a hit to L3 TLB 109, then, in step 417, PU 102 retrieves the requested translation (translation of a virtual address to its physical address) from L3 TLB 109.

If, however, there was a miss to L3 TLB 109, then, in step 418, PU 102 obtains the requested data by accessing page table 110 via a page walk.

Referring to FIG. 4 in further detail, in one embodiment, each private L2 data cache 105 maintains its own stack distance profilers 107, 108 and updates them upon accesses to it. When an epoch completes, it computes marginal utilities and sets up a (potentially different) configuration of the partition between data ways and translation ways. Misses (and writebacks) from the L2 data caches 105 go to the L3 data cache 106 which performs a similar update of its profilers 107, 108 and configuration outcome. A miss from the L3 data cache 106 is sent to L3 TLB 109. Finally, a miss in L3 TLB 109 triggers a page walk.

In one embodiment, CSALT-D assumes that the impact of data cache misses is equal for both data and translation entries, and as a result, both the data and translation LRU stacks had the same weight when computing the marginal utility. However, this is not necessarily true since a miss (e.g., TLB miss) can cause a long latency page walk. In order to maximize the performance, the partitioning algorithm needs to take the relative performance gains obtained by the translation entry hit (e.g., TLB entry hit) and the data entry hit in the data caches into account.

Therefore, in one embodiment, the dynamic partitioning scheme of the present invention considers the criticality of data entries, called "Criticality Weighted Dynamic Partitioning (CSALT-CD)." The insight from data and translation misses is used to incur different penalties on a miss in L2, L3 data cache 105, 106. Hence, the outcome of stack distance profiler 107, 108 is scaled by its importance or weight, which is the performance gain obtained by a hit in L2, L3 data cache 105, 106. In one embodiment, such scaling is enabled by hardware referred to herein as the "weight scaler" 112 shown in FIG. 1.

In CSALT-CD, a performance gain estimator is added to estimate the impact of a translation entry hit (e.g., TLB entry hit) and a data entry hit on performance. In an attempt to minimize hardware overheads, CSALT-CD uses existing performance counters. For estimating the hit rate of L3 data cache 106, CSALT-CD uses performance counters that measure the number of L3 hits and the total number of L3 accesses that are readily available on modern processors. For estimating the L3 translation (e.g., TLB) hit rate, a similar approach is used. Utilizing this information, the total number of cycles incurred by a miss for each kind of entry is computed dynamically. The ratio of the number of cycles incurred by a miss to the number of cycles incurred by a hit for each kind of entry is used to estimate the performance gain on a hit to each kind of entry. For instance, if a data entry hits in L3 data cache 106, the performance gain obtained is the ratio of the average DRAM latency to the total L3 access latency. If a translation entry (e.g., TLB entry) hits in L3 data cache 106, the performance gain obtained is the ratio of the sum of the TLB latency and the average DRAM latency to the total L3 access latency. These estimates of performance gains are directly plugged in as criticality weights which are used to scale the marginal utility from stack distance profiler 107, 108. A new quantity called the "Criticality Weighted Marginal Utility (CWMU)" is defined. For a partitioning scheme P which allocates N data ways out of K ways, CWMU, denoted as $CWMU_N^P$, is given by the following equation, $$CWMU_N^P = S_{Dat} \times \sum_{i=0}^{N-1} D_{LRU}(i) + S_{Tr} \times \sum_{j=0}^{K-N-1} TLB\_LRU(j). \quad (2)$$

In one embodiment, the partitioning scheme with the highest CWMU is used for the next epoch. In one embodiment, separate performance estimators are used for L2 and L3 data caches 105, 106 as the performance impact of L2 and L3 data caches 105, 106 is different. Algorithm 3 (see below) shows the pseudocode of CSALT-CD.

Algorithm 3 Computing CWMU

1: N = Input
2: D_LRU = Data LRU Stack
3: TLB_LRU = TLB LRU Stack
4: CWMU = 0
5:
6: for i in 0 : N − 1 do
7:     CWMU += $S_{Dat}$ × D_LRU (i)
8: for j in 0 : K − N − 1 do
9:     CWMU += $S_{Tr}$ × TLB_LRU (j)
10: return CWMU For a data entry, this performance gain is denoted by $S_{Dat}$, and for a translation entry, such as a TLB entry, by $S_{Tr}$. These criticality weights are dynamically estimated using the approach elaborated earlier. The rest of the flow (cache accesses, hit/miss evaluation, replacement decisions) is the same as in CSALT-D.

Both CSALT-D and CSALT-CD algorithms use stack distance profilers 107, 108 for both data and translation entries. The area overhead for each stack distance profiler 107, 108 is negligible. In one exemplary embodiment, the structure uses the MSA LRU stack distance structure, which is equal to the number of ways, so in case of L3 data cache 105, it is 16 entries. Computing the marginal utility may only need a few adders that will accumulate the sum of a few entries in stack distance profiler 107, 108. Both CSALT-D and CSALT-CD may also need an internal register per partitioned cache which contains information about the current partitioning scheme, specifically, N, the number of ways allocated for data in each set. The overhead of such a register is minimal, and depends on the associativity of the cache. Furthermore, the CSALT-CD algorithm uses a few additional hardware structures, which include the hit rates of L3 data cache 106 and L3 TLB 109. However, these counters are already available on modern processors as performance monitoring counters. Thus, estimating the performance impact of data caches and TLBs will only require a few multipliers that will be used to scale the marginal utility by weight. Therefore, the additional hardware overhead used to implement CSALT with criticality weighted partitioning is minimal.

In one embodiment, the replacement policy utilized by CSALT for the purpose of cache partitioning may be any type of replacement policy, such as the True-LRU replacement policy, the Not Recently Used (NRU) replacement policy or the Binary Tree (BT) pseudo-LRU replacement policy. For example, for NRU replacement policy, the LRU stack positions are estimated depending on the value of the NRU bit on the accessed cache line. For the BT pseudo-LRU policy, the notion of an Identifier (ID) is utilized to estimate the LRU stack position. Identifier bits for a cache line represent the value that the binary tree bits would assume if a given line held the LRU position. In either case, estimates of LRU stack positions can be used to update the LRU stack. It has been shown that using these estimates instead of the actual LRU stack position results in only a minor performance degradation.

Hence, the present invention includes an architecture which partitions the on-chip data caches to efficiently cache page table entries/TLB entries alongside data which reduces the conflicts between virtual to physical address translation and data accesses. This architecture helps to withstand the increased memory pressure from emerging large footprint workloads especially in the virtualized context switching scenarios.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A processor architecture, comprising:
   a first processor core comprising a first level translation lookaside buffer;
   a second level translation lookaside buffer located either internally or externally to said first processor core;
   a data cache partitioned into a first partition and a second partition to separately store data entries and translation entries, respectively,
      wherein said data cache is located either internally or externally to said first processor core;
   a data stack distance profiler for said data cache; and
   a translation stack distance profiler for said data cache,
      wherein said data stack distance profiler determines a data stack distance, which represents a position of a data entry in a data stack stored in said data cache at a reference time, and
      wherein said translation stack distance profiler determines a translation stack distance, which represents a position of a translation entry in a translation stack in said data cache at a reference time.

2. The processor architecture as recited in claim 1, wherein said data cache is a second level data cache.

3. The processor architecture as recited in claim 2 further comprising:
   a third level data cache, wherein said third level data cache is divided into a first partition to store data entries and a second partition to store translation entries.

4. The processor architecture as recited in claim 1 further comprising:
   a third level translation lookaside buffer, wherein said first, second and third level translation lookaside buffers store recent translations of virtual memory addresses to physical memory addresses; and
   a page table, wherein said page table stores a mapping between virtual addresses and physical addresses.

5. The processor architecture as recited in claim 4, wherein said third level translation lookaside buffer is implemented in die-stack dynamic random-access memory.

6. The processor architecture as recited in claim 4, wherein said third level translation lookaside buffer is implemented in static random-access memory.

7. The processor architecture as recited in claim 1 further comprising:
   a second processor core comprising a first level translation lookaside buffer.

8. The processor architecture as recited in claim 7, wherein said second level translation lookaside buffer is located externally to said first processor core and is shared across said first and second processor cores.

9. The processor architecture as recited in claim 7, wherein said data cache is a second level data cache, wherein said second level data cache is located externally to said first processor core and is shared across said first and second processor cores.

10. The processor architecture as recited in claim 7, wherein said second processor core further comprises:
    a second level translation lookaside buffer; and
    a second level data cache partitioned to store both data and translation entries.

11. The processor architecture as recited in claim 7, wherein said second processor core is connected to a third level data cache, wherein said third level data cache is shared across said first and second processor cores.

12. The processor architecture as recited in claim 3 further comprising:
    a data stack distance profiler for said third level data cache; and
    a translation stack distance profiler for said third level data cache, wherein said data stack distance profiler determines a data stack distance, which represents a position of a data entry in a data stack in said third level data cache, wherein said translation stack distance profiler determines a translation stack distance, which represents the position of a translation entry in a translation stack in said third level data cache.

13. The processor architecture as recited in claim 3 further comprising:
    a data stack distance profiler for each of said second level and third level data caches; and
    a translation stack distance profiler for each of said second level and third level data caches, wherein said data stack distance profiler determines a data stack distance, which represents a position of a data entry in a data stack, wherein said translation stack distance profiler determines a translation stack distance, which represents the position of a translation entry in a translation stack.

14. The processor architecture as recited in claim 13 further comprising;
    a weight scaler configured to scale outcomes of said data and translation stack distance profilers using a performance gained obtained by a hit in said second level and third level data caches.

15. The processor architecture as recited in claim 13, wherein said data and translation stack distance profilers are updated for said second level data cache in response to a miss to said second level data cache.

16. The processor architecture as recited in claim 15, wherein said first partition and said second partition of said second level data cache are adjusted in response to a fixed interval being completed.

17. The processor architecture as recited in claim 13, wherein said data and translation stack distance profilers are updated for said third level data cache in response to a miss to said third level data cache.

18. The processor architecture as recited in claim 17, wherein said partition of said third level data cache is adjusted in response to a fixed interval being completed.

19. The processor architecture as recited in claim 1, wherein said translation entries comprise translation lookaside buffer entries.

20. The processor architecture as recited in claim 1, wherein said translation entries comprise page table entries.

21. A processor architecture, comprising:
a first processor core comprising a first level translation lookaside buffer;
a second level translation lookaside buffer;
a data cache partitioned into a first partition to store data entries and a second partition to store translation entries;
a data stack distance profiler to determine a data stack distance representing a position of a data entry in said data cache; and
a translation stack distance profiler to determine a translation stack distance representing a position of a translation entry in said data cache.

* * * * *